United States Patent
Tsai

(10) Patent No.: US 8,724,016 B2
(45) Date of Patent: May 13, 2014

(54) DRIVER CIRCUIT FOR A CAMERA VOICE COIL MOTOR

(75) Inventor: Richard H. Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 229 days.

(21) Appl. No.: 13/081,246

(22) Filed: Apr. 6, 2011

(65) Prior Publication Data

US 2012/0257099 A1    Oct. 11, 2012

(51) Int. Cl.
*G03B 13/00* (2006.01)
*H04N 5/232* (2006.01)

(52) U.S. Cl.
USPC ............ 348/357; 348/347; 359/824; 359/819

(58) Field of Classification Search
USPC .......................... 348/357, 347; 359/819, 824
See application file for complete search history.

(56) References Cited

U.S. PATENT DOCUMENTS

| | | | |
|---|---|---|---|
| 5,838,515 A | 11/1998 | Mortazavi et al. | |
| 7,466,095 B1 | 12/2008 | Chui | |
| 2009/0021610 A1 | 1/2009 | Lee et al. | |
| 2009/0141136 A1 | 6/2009 | Watanabe | |
| 2010/0244761 A1* | 9/2010 | Galbiati et al. ............... | 318/599 |
| 2012/0257099 A1* | 10/2012 | Tsai .............................. | 348/349 |

OTHER PUBLICATIONS

"Data Sheet TDA5147K 12 V Voice Coil Motor (VCM) Driver and Spindle Motor Drive Combination Chip", Integrated Circuits, Product Specification, File under Integrated Circuits, IC11, Jul. 26, 1996, Philips Semiconductors, (pp. 1-32).
"Low Voltage Voice Coil Motor Driver", Allego® MicroSystems, Inc., A3904-DS, Rev. 4, Copyright 2007-2010, (pp. 1-7).
Kim, Kyung-Ho, et al., "A Mobile Auto-Focus Actuator Based on a Rotary VCM with the Zero Holding Current", Optics Express, vol. 17, No. 7, Mar. 30, 2009, © 2009 Optical Society of America, (pp. 5891-5896).
Murphy, Mark, et al., "Lens Drivers Focus on Performance in High-Resolution Camera Modules", Analog Dialogue 40-11, Nov. 2006, http://www.analog.com/analogdialogue, (pp. 1-3).
"Analog Devices—AD5821", 120 mA, Current Sinking, 12C(registered trademark) DAC, Product Discription, Feb. 2007, One Technology Way, Norwood, MA, USA, (17 pages).

* cited by examiner

*Primary Examiner* — Antoinette Spinks
(74) *Attorney, Agent, or Firm* — Blakely, Sokoloff, Taylor & Zafman LLP

(57) ABSTRACT

A driver circuit for a camera voice coil motor (VCM) is described. A first power switch selectively conducts current from a VCM node to a power supply node, and a second power switch selectively conducts current from the VCM node to a power return node. A pulse width modulation circuit controls the first and second power switches. In another embodiment, a switch mode current control circuit sources VCM current alternately from the power supply node and the power return node, into the VCM node. Other embodiments are also described and claimed.

15 Claims, 5 Drawing Sheets

DRIVER CIRCUIT FOR A CAMERA VOICE COIL MOTOR

An embodiment of the invention relates to an electronic driver circuit for driving an autofocus lens actuator voice coil motor. Other embodiments are also described.

BACKGROUND

Most cameras have an autofocus mechanism in which an autofocus algorithm processor determines an optimum position of a variable focal length lens that is expected to yield an image of a scene being captured with acceptable sharpness. An autofocus lens actuator can then automatically move the lens to the desired position. The lens actuator contains a voice coil motor (VCM) to which the lens is coupled. A restoring spring is also provided, so that when the VCM is not being powered, the lens is mechanically pre-loaded at or moved to a default position. When the autofocus mechanism is invoked, the desired position of the lens (as computed by the autofocus processor) is translated into a driver level or driver value. The driver value may represent the average level of current that when fed through the VCM is expected to overcome the restoring force of the spring and move the lens to a corresponding position. A typical VCM driver has a linear current control circuit that can be programmed through a digital communications interface (e.g., I²C compatible serial interface). The typical driver circuit is also packaged within a six-pin integrated circuit package and is suitable for use in digital camera modules of portable or mobile devices such as smart phones and tablet computers.

SUMMARY

An embodiment of the invention is a driver circuit suitable for driving a camera voice coil motor (VCM). The driver circuit has a power supply node, a power return node, and a VCM node. The VCM has at least two terminals; one of them may be directly connected to the power supply node while the other is coupled to the VCM node. The driver circuit also has a switch mode current control circuit. The latter includes a first power switch to selectively conduct current from the VCM node to the power supply node during a current recirculation phase of switch mode operation. A second power switch is to selectively conduct the current from the VCM node to the power return node. A pulse width modulation (PWM) circuit is coupled to control the first and second power switches. The PWM circuit may be programmed to achieve a desired average current through the VCM, using a digital communications interface such as a serial bus interface having a data line, a clock line, and a power_down or sleep line. The driver circuit may be implemented in a six-pin integrated circuit package and may be used for controlling the VCM of an autofocus lens actuator. The actuator and driver circuit may be part of a digital camera module that is designed for small space applications, such as a smart phone or a tablet computer. The driver circuit may alternatively be used for other camera lens applications, including driving a zoom lens actuator or a mechanical shutter actuator.

In another embodiment, one of the two VCM terminals is coupled to the VCM node of the driver circuit while the other is directly connected to the power return node. In this embodiment, the switch mode current control circuit sources the VCM current alternately from the power supply node and the power return node, into the VCM node.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to ""an"" or ""one"" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
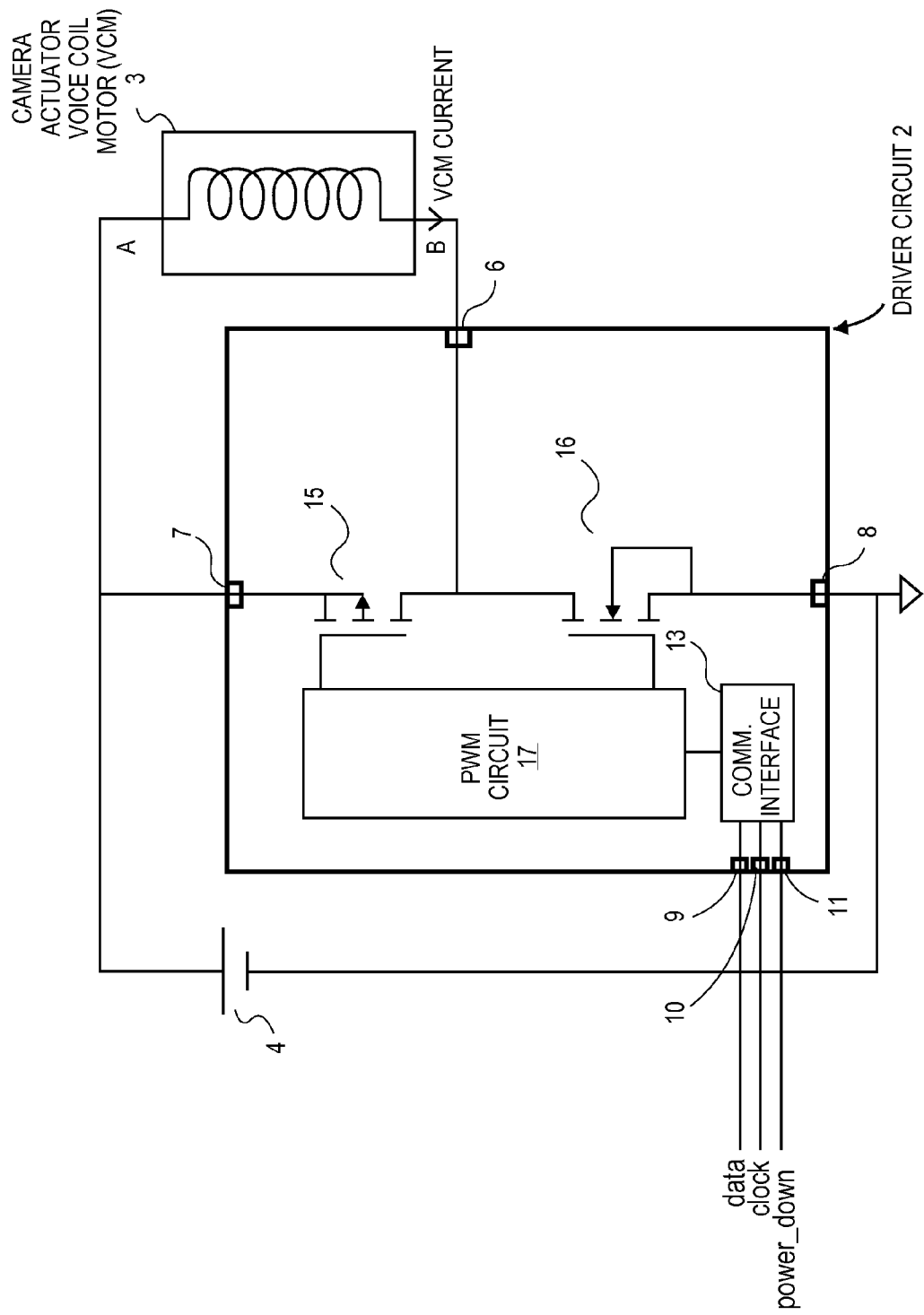
FIG. 1 is a circuit schematic of a driver circuit according to an embodiment of the invention.

FIG. 1 is a circuit schematic of a driver circuit 2, in accordance with an embodiment of the invention. The driver circuit 2 drives current through a voice coil motor (VCM) 3, which is part of a camera actuator, e.g. an autofocus lens actuator (see FIG. 4). The VCM 3 may be part of a linear or rotary electromechanical actuator having at least one inductor (also referred to as a coil or winding) 5. As shown, the VCM 3 (and its coil 5) has a terminal A that may be directly coupled to a power supply node 7 of the driver circuit 2. That same terminal of the VCM 3 may also be directly connected to a dc power supply, here a battery 4. The negative terminal of the battery 4 (or the power return terminal of the dc power supply) may be directly connected to a circuit ground at the power return node 8 of the driver circuit 2. The other terminal B of the VCM 3 may be directly connected to a camera VCM node 6. A first power switch 15 couples the nodes 6, 7, and is operated to selectively, i.e. alternately on and off, conduct the VCM current from the VCM node 6 to the power supply node 7. As described below, this occurs during a recirculation phase of operation for the VCM 3. The driver circuit 2 also has a second power switch 16 that couples the VCM node 6 with a power return node 8. The second power switch 16 is controlled or operated to selectively conduct the VCM current from the VCM node 6 to the power return node 8. The first and second power switches 15, 16, in this example, share a common node that is directly connected to the VCM node 6 as shown. The power switches 15, 16 could be insulated gate"

field effect transistors or other solid-state active devices that can suitably perform as a power switch.

Figure 2:
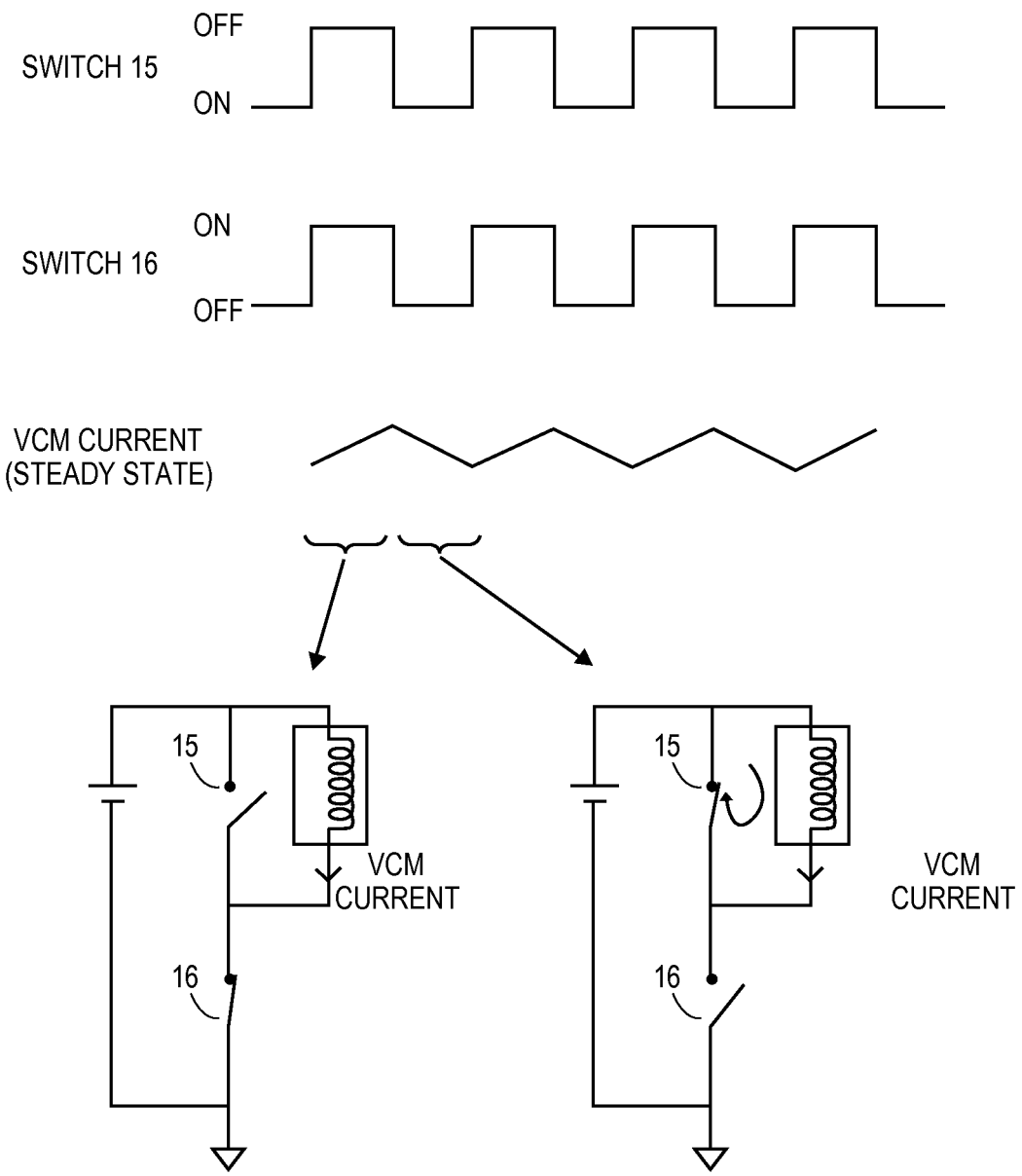
FIG. 2 depicts the pulse width modulated control signals for the power switches of the driver circuit, a resulting VCM current waveform, and a schematic showing the path taken by the VCM current in the different states of the power switches.
Figure 3:
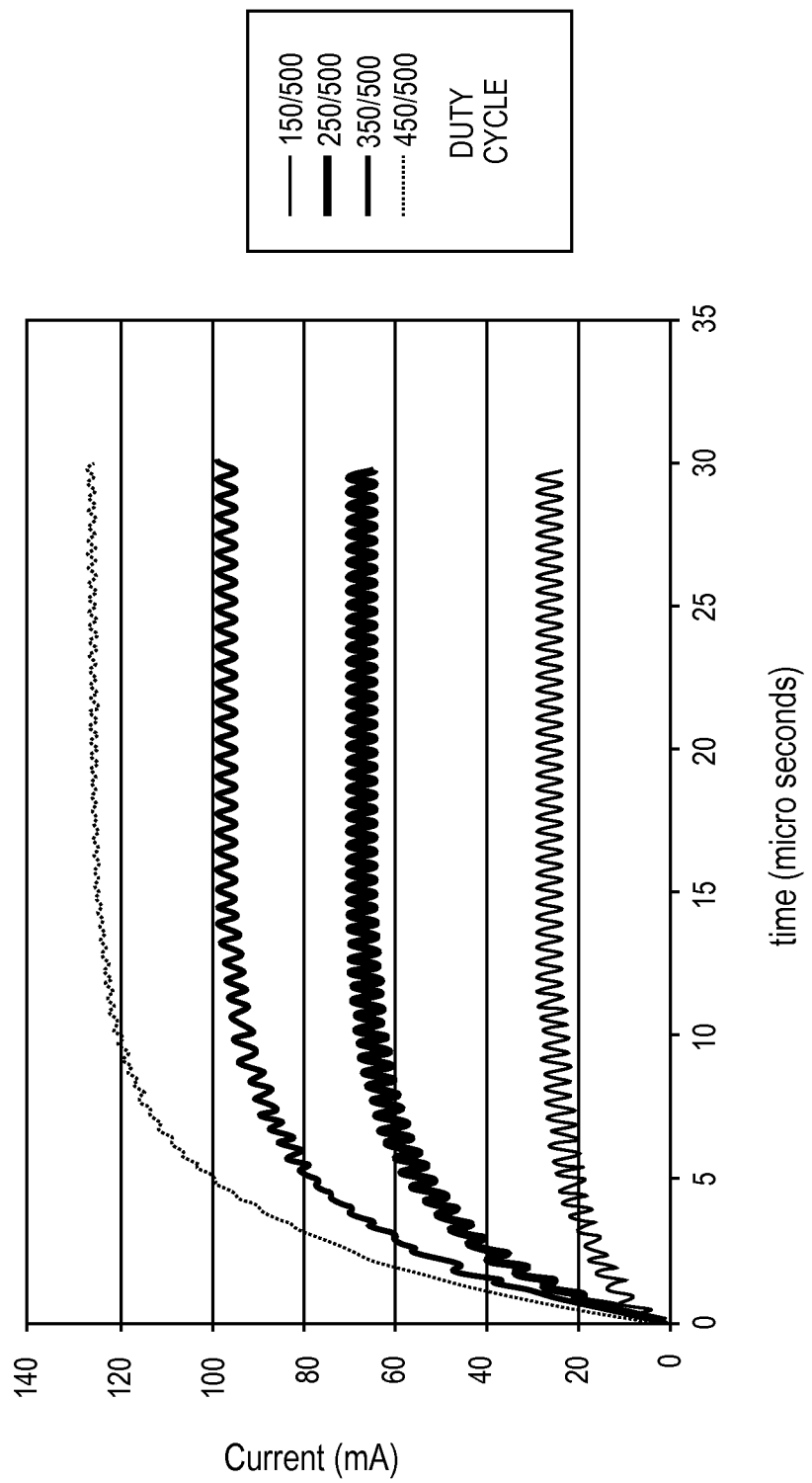
FIG. 3 shows the transient and steady state VCM current as a function of different duty cycles of the pulse with modulated control signals, in accordance with a particular example.

The first and second power switches 15, 16, are operated by a pulse width modulation (PWM) circuit 17 that is coupled to the control electrodes of the power switches 15, 16, in order to operate the latter so that a steady state VCM current waveform can be obtained. This is depicted in FIG. 2. The PWM circuit 17 produces variable duty cycle signals that drive the control terminals or control electrodes of the first and second power switches 15, 16, respectively. This results in a saw tooth VCM current waveform, which is depicted in the steady state in FIG. 2. The transient and steady state behavior of the VCM current is shown in FIG. 3, for different duty cycle settings. It can be seen that the steady state average current is a function of the duty cycle, such that as the duty cycle is increased the average VCM current is also increased. The waveforms in FIG. 2 depict a fifty percent duty cycle, as an example. Referring to FIG. 2, when the switch 16 is turned on (switch 15 is off), the VCM current builds by virtue of being supplied directly from the positive dc power supply 4. When the switch 16 is turned off and switch 15 is turned on about simultaneously, the VCM current decays as it re-circulates through the switch 15 and the positive power supply terminal, as shown in FIG. 2. This sequence continues until a steady state current is reached which is a function of the duty cycle of the power switches. This is also referred to as a switch mode control of the VCM current.

Referring back to FIG. 1, the driver circuit 2 also has a communications interface 13, which is used by an external processor (not shown) to set the steady state VCM current. The communications interface 13 may be a digital interface that complies with the I²C Specification, Rev. 03, 19 Jun. 2007, and may be on-chip with the power switches 15, 16, and the PWM circuit 17. As shown in FIG. 1, the digital communications interface may include a data line (data node 9), a clock line (clock node 10), and a power_down or sleep line (power_down node 11). These three digital lines may be used by an off-chip processor that has been programmed to configure or program a duty cycle of the PWM circuit 17 in order to set an average VCM current. The communications interface 13 may contain registers that can be programmed to store a desired PWM duty cycle setting, with which the PWM circuit is programmed. The power_down line may be used by the off-chip processor to asynchronously command the driver circuit 2 to enter a sleep mode in which the second power switch 16 is turned off (that is, the switch is opened), while the first power switch 15 is turned on, thereby allowing the VCM current to quickly decay to zero and to bring power consumption of the driver circuit to a minimum. This may be desired, for instance, when the camera function is to be disabled in the host device (which contains the driver circuit 2 and the camera lens actuator).

Figure 4:
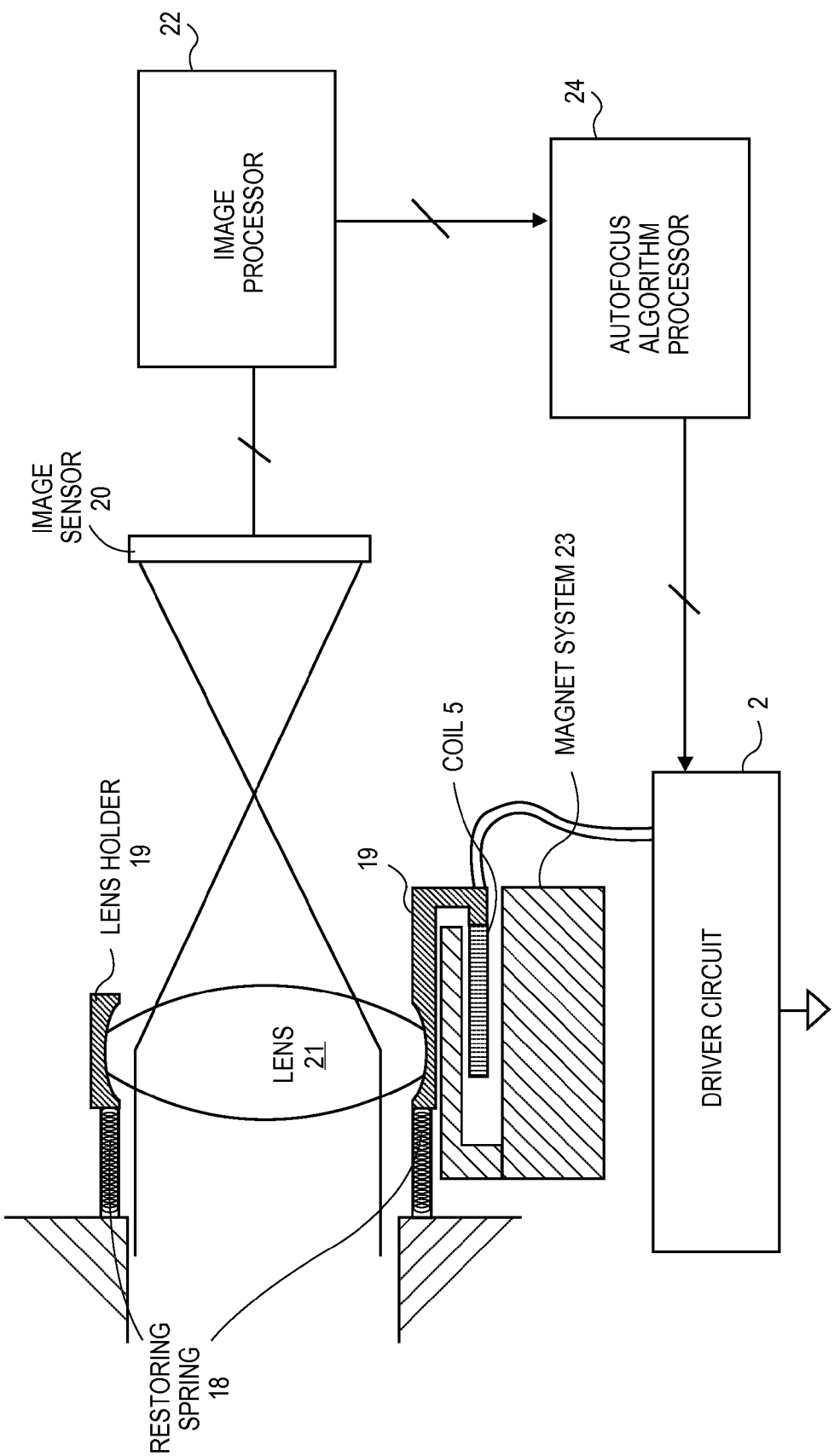
FIG. 4 is a block diagram of part of a camera showing a camera actuator.

Turning now to FIG. 4, relevant portions of a host device and its camera module are shown. Examples of such host devices are dedicated digital still and video cameras, desktop computers, smart phones, tablet computers and other consumer electronic devices that have camera functionality. The module has a camera lens 21 that has been installed into a lens holder 19. The coil 5 is attached to the lens holder 19, and is located within a magnetic flux air gap of a magnet system 23. The coil 5 has a pair of terminals that are coupled to be driven by the driver circuit 2. The coil 5 and therefore the lens holder 19 will move in accordance with the particular level of average current that is being passed through the coil 5, as set by the driver circuit 2. The coil 5 as part of the VCM 3 and camera lens actuator thus converts this current into movement to a given position. In this example, the camera lens is moveable to achieve variable focal length, for use in an autofocus mechanism. As an alternative, the lens actuator mechanism including the lens holder 19 and the coil 5 could be used in other camera actuator applications such as a zoom lens or an electromechanical shutter.

A restoring spring 18 is provided that pre-loads or biases the lens holder 19 into an inactive or default position. Accordingly, the activation of the actuator (by passing the desired average current through the VCM 3) occurs in a single direction, meaning that the VCM current is unidirectional through the coil 5, because the holder 19 needs to be actively powered in just one direction.

The camera module in FIG. 2 also has an image sensor 20 that is positioned to receive the optical image produced by the lens. The host device contains an image processor 22 that collects the digital image data from the image sensor 20 (and may store the same in memory or other data storage not shown). An autofocus algorithm processor 24 obtains sample digital images from the image processor 22, and analyses them in accordance with known autofocus algorithms to determine a sharpness parameter. Based on comparison of the sharpness parameter to a predetermined threshold, the autofocus processor signals a change in the position of the lens 21, and repeats the sharpness calculation and comparison at the new position. This sequence continues to as to sweep across a range of lens positions, until a desired level of sharpness has been found. The autofocus algorithm processor 24 may include a mapping of several lens positions (in terms of distance) to their corresponding VCM current steady state levels (in terms of PWM duty cycle settings). The final or desired duty cycle setting is then signaled to the driver circuit 2, and then a picture (which is now in focus) is taken at the corresponding lens position. Other autofocus algorithms are possible.

A camera module has been described that includes a camera lens 21 and a VCM including the coil 5 and holder 19 that is coupled to move the lens. The driver circuit 2 has a switch mode current control circuit that controls VCM current from one terminal of the VCM, conducting the drawn VCM current alternately to a power return node and the power supply node. Thus, referring to FIG. 1, the driver circuit 2 includes the PWM circuit 17 and the first and second power switches 15, 16 that are driven in complementary manner (see waveforms in FIG. 2) and may constitute part of the switch mode current control circuit. In one embodiment, the VCM current does not "reverse direction" for the full range of movement of the camera lens. To move the lens backwards, a spring is coupled to restore the camera lens towards a default position when the driver circuit 2 has been powered down. An average value for the VCM current, which represents a position of the camera lens, may be programmed into the PWM circuit 17, using a communications interface that may be on-chip with the driver circuit. This allows digital control of the position of the lens, by an autofocus processor that may be external to the driver circuit, e.g. off-chip.

Figure 5:
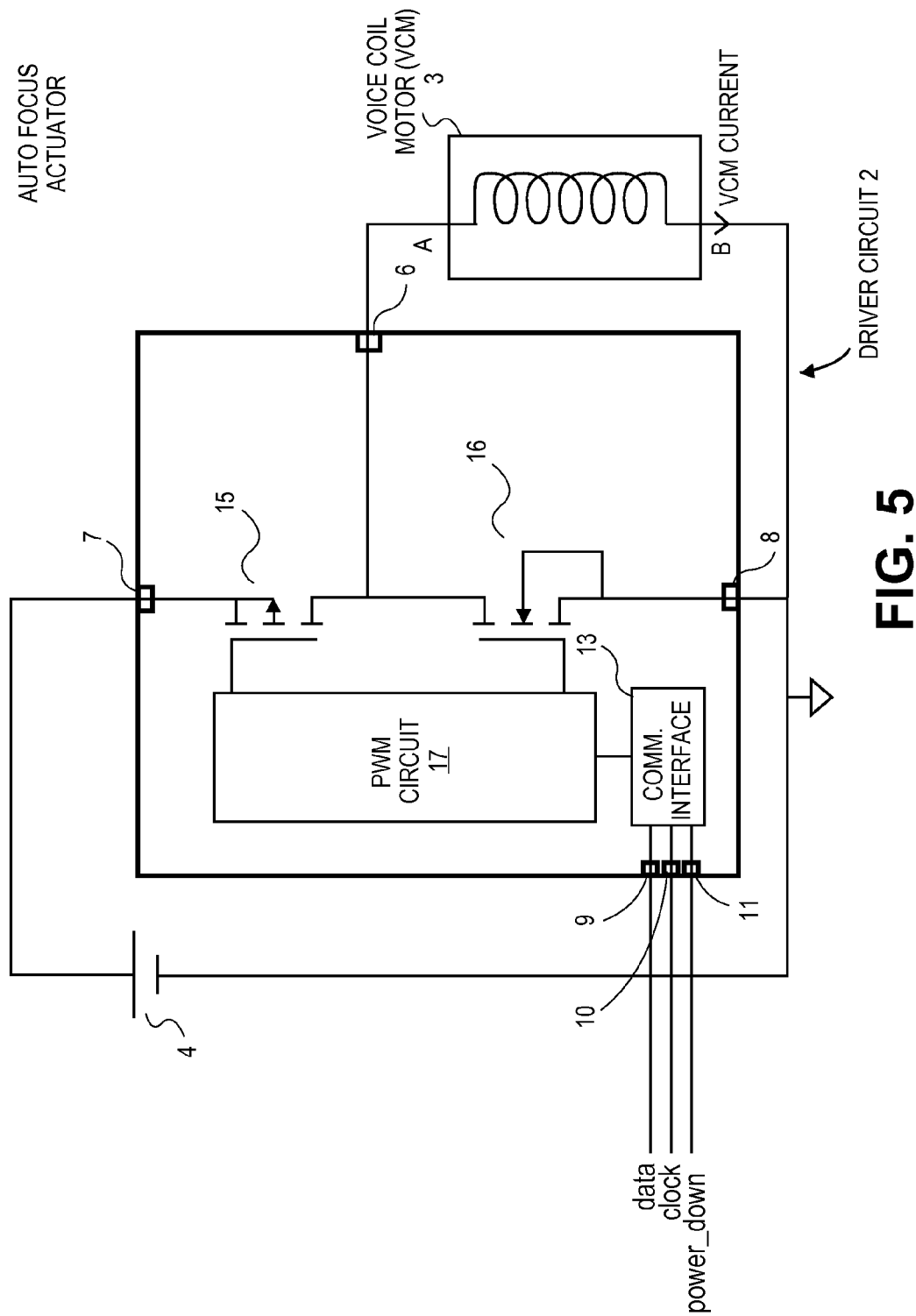
FIG. 5 is a circuit schematic of the driver circuit, according to another embodiment of the invention.

FIG. 5 depicts an alternative to the arrangement of FIG. 1, where in this case the VCM node 6 is directly connected to the terminal A of the VCM 3, and terminal B is directly connected to the power return node 8. Operation of the PWM circuit 17 and the power switches 15, 16 are similar to FIG. 1, except that the recirculation phase is performed by the second power switch 16 by selectively conducting current from the power return node 8 and into the VCM node.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although FIG. 1 shows the schematic of a driver circuit 2 in which the power switches 15, 16 are depicted as insulated gate field effect transistors, other solid-state active devices that can suitably perform as a power switch may be used as well. The description is thus to be regarded as illustrative instead of limiting.

What is claimed is:

1. A driver circuit for a camera voice coil motor, VCM, comprising:
 a power supply node;
 a power return node;
 a camera VCM node to be coupled to a coil of the VCM to conduct VCM coil current from the power supply node without an intervening active device;
 a first power switch to selectively conduct the VCM coil current from the VCM node to the power supply node;
 a second power switch to selectively conduct the VCM coil current from the VCM node to the power return node; and
 a pulse width modulation, PWM, circuit coupled to control the first and second power switches.

2. The driver circuit of claim 1 further comprising:
 a communications interface on-chip with the first and second power switches and the PWM circuit, through which an off-chip processor programs a duty cycle of the PWM circuit to set an average VCM coil current.

3. The driver circuit of claim 2 wherein the power supply and return nodes, the camera VCM node, the first and second power switches, and the PWM circuit are all in the same integrated circuit package.

4. The driver circuit of claim 3 wherein the integrated circuit package has six pins of which three are coupled to transfer communications signals to and from the communications interface, two are the power supply and return nodes, and one is the camera VCM node.

5. A camera module, comprising:
 a camera lens;
 a voice coil motor, VCM, coupled to move the camera lens, the VCM having a first terminal directly connected to a power supply node, and a second terminal; and
 a driver circuit having a switch mode current control circuit to draw VCM coil current from the second terminal of the VCM and conduct the drawn VCM coil current alternately to a power return node and the power supply node.

6. The camera module of claim 5 further comprising a spring coupled to restore the camera lens towards a default position.

7. The camera module of claim 6 wherein the VCM coil current does not reverse direction for the full range of movement of the camera lens.

8. The camera module of claim 7 further comprising a communications interface on-chip with the driver circuit through which an off-chip processor programs the driver circuit to set an average value for the VCM coil current, representing a position of the camera lens.

9. The camera module of claim 8 wherein the driver circuit and the communications interface are in the same integrated circuit package.

10. The camera module of claim 9 wherein the integrated circuit package has six pins of which three are coupled to transfer communications signals to and from the communications interface, two are the power supply and return nodes, and one is to be directly connected to the second terminal of the VCM.

11. The camera module of claim 8 wherein the switch mode current control circuit comprises a pulse width modulation circuit, PWM, circuit that is coupled to control first and second power switches that share a common node that is directly connected to the second terminal of the VCM.

12. An electronic device comprising:
 a camera lens;
 a camera lens actuator having a voice coil motor, VCM, coupled to the camera lens, the VCM having a first coil terminal coupled to a power supply node without any intervening active devices, and a second coil terminal;
 a driver circuit having a switch mode current control circuit to draw VCM coil current from the second coil terminal of the VCM and conduct the drawn VCM coil current alternately to a power return node and the power supply node;
 an image sensor positioned to receive an optical image of a scene formed by the camera lens;
 an image processor coupled to the sensor to produce a digital image of the scene; and
 an autofocus processor coupled to analyze the digital image and on that basis control the driver circuit.

13. The electronic device of comprising a pre-load spring coupled to the camera lens.

14. The electronic device of claim 13 wherein the VCM coil current does not reverse direction for the full range of movement of the camera lens.

15. The electronic device of claim 12 further comprising a communications interface on-chip with the driver circuit through which the autofocus processor programs the driver circuit to set an average value for the VCM coil current, representing a position of the camera lens.

* * * * *